(12) United States Patent
Buoni

(10) Patent No.: US 6,472,050 B1
(45) Date of Patent: Oct. 29, 2002

(54) LIGHT STABLE FLUORESCENT VINYL SUITABLE FOR USE AS A HIGHWAY RETROREFLECTIVE ROLL-UP SIGN

(75) Inventor: Drew J. Buoni, Chicago, IL (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/476,288

(22) Filed: Dec. 30, 1999

(51) Int. Cl.[7] .................... G02B 5/122; C08L 27/06
(52) U.S. Cl. ................. 428/156; 428/143; 428/522; 359/515; 359/529; 359/534; 524/90; 524/102; 524/567
(58) Field of Search .................. 428/143, 156; 359/515, 529, 534; 524/90, 162, 567

(56) References Cited

U.S. PATENT DOCUMENTS

| | | |
|---|---|---|
| 4,115,386 A | 9/1978 | Gall et al. |
| 4,230,858 A | 10/1980 | Gall et al. |
| 4,286,094 A | 8/1981 | Hoch et al. |
| 4,980,512 A | 12/1990 | Aumueller et al. |
| 5,300,583 A | 4/1994 | Foá et al. |
| 5,387,458 A | 2/1995 | Pavelka et al. |
| 5,455,289 A | 10/1995 | Caselli |
| 5,470,502 A | 11/1995 | Hahn et al. |
| 5,605,761 A | 2/1997 | Burns et al. |
| 5,612,107 A * | 3/1997 | Sangani et al. ............. 428/352 |
| 5,672,643 A | 9/1997 | Burns et al. |
| 5,674,622 A | 10/1997 | Burns et al. |
| 5,710,197 A | 1/1998 | Fischer et al. |
| 5,736,596 A | 4/1998 | Heitz et al. |
| 5,754,337 A | 5/1998 | Burns et al. |
| 5,805,338 A * | 9/1998 | Janovec ..................... 359/529 |
| 5,808,073 A | 9/1998 | Böhm et al. |
| 5,920,429 A | 7/1999 | Burns et al. |
| 5,962,108 A | 10/1999 | Nestegard et al. |

FOREIGN PATENT DOCUMENTS

| | | |
|---|---|---|
| WO | WO 99/20688 | 4/1999 |
| WO | WO99/21937 | 5/1999 |
| WO | WO 99/48961 | 9/1999 |

* cited by examiner

*Primary Examiner*—William P. Watkins, III
(74) *Attorney, Agent, or Firm*—Jones, Day, Reavis & Pogue

(57) ABSTRACT

Polyvinyl chloride ("PVC") compositions and articles are provided which are suitable for fabricating flexible, reflective roll-up roadway signs in which a fluorescent perylene imide dye is present in the PVC reflective layer. The compositions afford enhanced fluorescence durability of perylene imide fluorescent dyes in the articles through the combination of a polymeric hindered amine light stabilizing compound having molecular weight greater about 1500, and a benzophenone ultraviolet absorbing compound. The compositions and articles preferably further comprise a polymeric plasticizer having molecular weight in the range of about 2000 to about 8000 to provide enhanced retention of retroreflectivity in flexible PVC highway signs.

29 Claims, No Drawings

LIGHT STABLE FLUORESCENT VINYL SUITABLE FOR USE AS A HIGHWAY RETROREFLECTIVE ROLL-UP SIGN

FIELD OF THE INVENTION

The present invention relates generally to polymeric articles containing fluorescent dyes. More particularly, the invention concerns dye-stabilized polyvinyl chloride compositions, and articles therefrom, useful for making flexible retroreflective sheeting that has superior fluorescence durability and improved retention of retroreflectivity.

BACKGROUND OF THE INVENTION

In the highway construction industry, fluorescent orange warning signs are used to alert drivers of on-going construction activity. The bright color and/or the fluorescent material attracts the driver's eye to the sign. Typically, these signs are fabricated by adhesive lamination of retroreflective sheeting to a rigid aluminum or wood sign substrate. However, such a rigid construction has two primary problems. First, the wood or aluminum substrate makes these signs bulky and awkward to move, especially for temporary highway construction activities. Second, such signs can present a potentially deadly hazard to construction zone workers. When hit by a vehicle moving at high speeds, these rigid signs become projectiles capable of severely injuring a worker. Hence the need for soft, flexible signs which can easily be rolled-up and moved, and which do not present a projectile hazard.

Fluorescent roll-up signs fabricated from flexible polyvinyl chloride ("PVC") are known in the art. Unfortunately, when used to manufacture microprismatic retroreflective films, flexible PVC suffers from two serious drawbacks: loss of retroreflectivity, and loss of fluorescence. Loss of retroreflectivity is due in part to the fact that PVC is a soft, flexible material. Unlike polymethyl methacrylate or polycarbonate microprisms (used in traditional sheeting materials) which are rigid and inflexible, microprisms formed in plasticized PVC are subject to deformation when the sheeting material is exposed to high tension or pressure as is typically the case under the stress conditions encountered in the production, handling and ultimate roadway use of such sheetings. Typically, if the microprism cube corner angles change by more than about 0.01°, the retroreflective levels will be significantly reduced.

Losses in retroreflectivity can further be attributed to the use of plasticizer compounds in the manufacture of PVC film. Plasticizers are typically added to PVC resin to make the resin more flexible. However, most plasticizers will eventually migrate from the PVC film. When the flexible PVC is used for retroreflective applications, such migration can result in retroreflectivity losses due to slight disfiguration of the microprisms as the plasticizer exudes from the film and changes the film's overall material composition. This phenomenon is particularly noticeable in outdoor applications where the material may be exposed to elevated temperatures during the summer months. The plasticizers commonly used in PVC retroreflective film are low molecular weight monomeric plasticizers (typically <700 grams/mole) and often from the phthalate family, such as dioctyl phthalate or diisononyl phthalate. Given the problems noted above, there is presently a need to provide PVC reflective sheeting capable of retaining more of its retroreflectivity over time.

A further problem in fluorescent PVC roll up signs is that ultraviolet exposure causes the fluorescence to fade very quickly, typically in two to three months. To circumvent this problem, many manufacturers create fluorescent orange PVC roll-up sheets by combining two different layers of PVC. A top (outer) layer of the flexible PVC is colored with a fluorescent pink colorant. A lower layer having reflective elements is colored with a non-fluorescent orange colorant. The combination of these two layers produces a brilliant fluorescent orange color. After the pink flourescent layer fades (which typically occurs in 2–3 months of outdoor exposure), a non-fluorescent orange sign will remain. Although this approach for extending the useful life of flexible highway signs has met with some acceptance, it still does not address the fundamental problem of how to achieve a more stable (and therefore longer-lived) fluorescence in retroreflective PVC roll-up films when fluorescent dyes are incorporated directly into the retroreflective PVC layer.

SUMMARY OF THE INVENTION

The present invention provides a fluorescence-stabilized polymeric composition comprising: polyvinyl chloride resin; a fluorescent dye selected from the group consisting of perylene imide fluorescent dyes; an ultraviolet absorbing compound selected from the group consisting of benzophenone ultraviolet absorbers; and a light stabilizing compound selected from the group consisting of polymeric hindered amine light stabilizer compounds having molecular weight greater than about 1500. The combination of benzophenone UV absorbers and polymeric HALS lends surprising stability to the perylene imide dyes.

The invention is further directed to a polymeric film suitable for fabricating retroreflective sheeting, comprising polyvinyl chloride resin and a polymeric plasticizer having molecular weight greater than about 1000, and preferably in the range of about 2000 to about 8000. Particularly preferred are polymeric plasticizers having molecular weight in the range of about 2500 to about 5000. It has been discovered that the use of a polymeric plasticizer can substantially minimize the retroreflectivity losses which flexible PVC signs typically exhibit over time.

In still a further aspect the invention is directed to a flexible road sign capable of being manually rolled and unrolled by a user, wherein the sign comprises a fluorescent, retroreflective polymeric sheet. The retroreflective sheet comprises a polyvinyl chloride resin having an intrinsic viscosity in the range of about 1.02 to about 1.14; a polymeric plasticizer having molecular weight in the range of about 2000 to about 8000; a fluorescent perylene imide dye; an ultraviolet absorbing benzophenone compound; a polymeric hindered amine light stabilizing compound having molecular weight greater than about 2000; and further comprising a plurality of retroreflective elements.

In a particularly preferred embodiment the invention is a flexible, rollable fluorescence-stabilized retroreflective road sign comprising a retroreflective, flourescent sheet, where the retroreflective sheet comprises; (i) polyvinyl chloride resin having an intrinsic viscosity in the range of about 1.08 to about 1.10; (a) a plasticizer mixture comprising (1) a polymeric plasticizer selected from polyester glutarate, adipate or sebacate plasticizers having molecular weight in the range of about 2500 to about 4200, and (b) a monomeric plasticizer selected from phthalate plasticizers having molecular weight less than about 1000; wherein the polyester plasticizer constitutes about 25 to about 45 percent by weight of the plasticizer mixture; and the plasticizer mixture is present in the polymeric sheet in an amount ranging from about 30 to about 35 parts per hundred by weight of said polyvinyl resin in the sheet; (iii) a mixture of perylene imide fluorescent dyes comprising BASF Lumogen F Red 300 and BASF Lumogen F Orange 240, wherein the dye mixture constitutes about 0.05 to about 0.5 percent by weight of the sheet; (iv) an ultraviolet absorbing compound comprising 2-hydroxy-4-n-octoxybenzophenone present in an amount constituting about 0.2 to about 4 percent by weight of the sheet; (v) a polymeric hindered amine light stabilizing compound comprising the polymerization product of dimethyl succinate and 4-hydroxy-2,2,6,6-tetramethyl-1-piperidine and having molecular weight greater than about 2000, wherein the light stabilizing compound constitutes about 0.1 to about 3 percent by weight of the sheet; and (vi) a plurality of cube-corner retroreflective elements.

In still a further embodiment, the invention provides a polymeric retroreflective film comprising polyvinyl chloride resin and a plurality of retroreflective elements in the form of corner-cube microprisms, wherein the film exhibits an "Average Percent Retention of Retroreflectivity" (as determined herein) of about 60% or greater.

The invention provides a number of significant advantages. For the first time, fluorescent PVC films suitable for roll-up signs are now able to exhibit greatly enhanced fluorescence durability. In addition, PVC films in accordance with the invention show "Average Percent Retention of Retroreflectivity" (as described in the Examples) of about 60% or greater. The enhancements in fluorescence and retention of retroreflectivity made possible by the invention will substantially extend the useful life of flexible PVC roll-up signs beyond that currently attainable. Moreover, it will no longer be necessary to laminate additional fluorescence-protective polymeric layers onto PVC reflective sheeting to compensate for the poor fluorescence stability such products have exhibited to date. Further advantages will become apparent hereinafter to those skilled in the art.

DETAILED DESCRIPTION

Although light absorbers and stabilizers have commonly been employed in the past to improve the light stability of flexible non-dyed PVC films, until the present invention the art has not found a way to prevent fluorescent dyes from rapidly losing their fluorescent properties when such dyes are incorporated directly into PVC films. Accordingly, the present invention is based in part on our discovery that the fluorescence stability of perylene imide dyes in PVC articles can be markedly enhanced by incorporating into a PVC formulation used to make the article the combination of a benzophenone UV absorber and a polymeric hindered amine light stabilizer ("HALS") compound. Our discovery is rather surprising and unexpected for a number of reasons. First, other workers in this art have taught that HALS compounds having molecular weights exceeding 1000 grams/mole performed poorly in the stabilization of fluorescent thioxanthene dies in PVC film (see PCT WO99/20688, published Apr. 29, 1999). Secondly, we have found that the HALS/benzophenone combination works substantially better than the combination of HALS and a benzotriazole UV absorber. This is quite unexpected considering that the benzotriazoles, per se, are recognized in the art as better UV absorbing compounds than the benzophenones. Finally, there is a significant body of scientific literature suggesting that HALS compounds are incompatible with PVC. In particular, the art has recognized that amine groups tend to accelerate the degradation of PVC through dehydrochlorination of the vinyl polymeric backbone during high temperature processing.

The flourescent dyes used in the present invention are dyes selected from the well-known general class of dyes known as perylene imides. Examples thereof are the perylene imide dyes having the general formula:

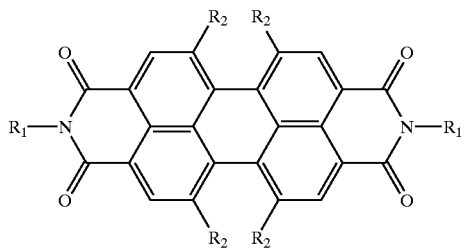

where $R_1$ is $C_5$–$C_{20}$-alkyl which may be interrupted by an oxygen atom, or is phenyl which is monosubstituted or poly substituted by $C_1$–$C_{13}$ alkyl or $C_1$–$C_{13}$-alkoxy; and $R_2$ is hydrogen, chlorine, phenoxy, or halogen-, $C_1$–$C_4$ alkyl, or $C_1$ to $C_4$ alkoxy-substituted phenoxy.

Preference is given to dyes having the above structure, and blends thereof, in which $R_1$ is selected from —$C_3H_6$—$OC_2H_5$ and 2,6-diisopropylphenyl; and $R_2$ is selected from H, Cl and phenoxy.

Examples of such dyes are found in U.S. Pat. Nos. 5,736,596 and 5,470,502, which are incorporated herein by reference.

Further perylene imide fluorescent dyes contemplated for use in the invention are the dyes and dye blends disclosed in U.S. Pat. Nos. 5,736,596; 5,470,502; 5,808,073; 4,286,094; 4,115,386; 4,230,858; 5,920,429; 5,710,197; 5,674,622; 5,672,643; 5,605,761; 5,754,337; 5,387,458; and WO9921937 all of which are incorporated herein by reference in their entirety.

While any suitable color of perylene imide fluorescent dye may be used in the invention, the orange, red and yellow perylene imide fluorescent dyes are particularly well-suited to reflective PVC road sign applications because of their enhanced visibility under daytime as well as nightime driving conditions. Particularly preferred are the fluorescent orange and red dyes.

Specific examples of a perylene imide fluorescent dyes particularly preferred for use in the invention are "Lumogen F Orange 240" and "Lumogen F Red 300." which are commercially available from BASF.

The amount of dye to be used in a fluorescent PVC composition according to the invention is in the range of about 0.05 to about 0.5 percent, and preferably in the range of to 0.20 to about 0. 25 percent based on the total weight of the PVC formulation used to fabricate a flexible PVC sheet.

Benzophenone UV absorbing compounds are well known in the art. See e.g., U.S. Pat. No. 4,980,512. Although any benzophenone UV absorber may be used in the invention, particularly suitable are those having the general formula:

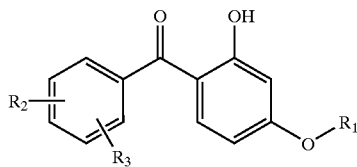

where $R_1$ is $C_1$ to $C_8$ alkyl; and $R_2$ and $R_3$ are independently H, OH, $C_1$–$C_8$ alkoxy, $C_1$ to $C_4$ alkyl or halogen. Preferably $R_2$ and $R_3$ are H, and $R_1$ is selected from -n-$C_8H_{17}$ or —OCH₃. Examples of suitable benzophenone compounds are 2-hydroxy-4-n-octoxybenzophenone commercially available from Great Lakes Chemical Corporation under the trade name "Lowilite 22," and also from Ferro Corporation under the trade name "UV-Chek AM-300". Another suitable benzophenone is 2-hydroxy-4-methoxybenzophenone commercially available from Cytec, Inc. under the trade name "Cyasorb 351."

The amount of benzophenone UV absorber suitable for use in a fluorescent PVC composition according to the invention is in the range of about 0.2 to about 4 percent, and preferably in the range of about 1.25 to about 2.5 percent based on the total weight of the PVC formulation used to fabricate a fluorescent PVC article.

Hindered amine light stabilizer ("HALS") compounds suitable in the present invention are polymeric having molecular weights of about 1500 and greater. The term "hindered amine light stabilizer" is intended to mean any additive used to stabilize fluorescent dyes where the compound has at least one secondary or tertiary amine. Examples of HALS compounds which are particularly suitable for use in the invention are the polymeric hindered amine compounds obtained by polymerizing in a known manner dimethyl succinate with 4-hydroxy-2,2,6,6-tetramethyl-1-piperidine ethanol. Such HALS compounds have the general formula:

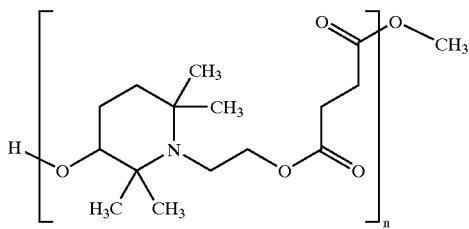

In the above formula, "n" is preferably selected such that the polymeric HALS has a molecular weight of at least about 2000, and most preferably greater than about 2500. Specific examples of such HALS compounds are "Lowilite 62" sold by Great Lakes Chemical Corporation and "Tinuvin 622" sold by Ciba-Geigy Corporation both having molecular weight above 2500. Although other workers in this art have found these polymeric HALS compounds do not work as fluorescent stabilizers for thioxanthene dyes in PVC film (see PCT W099/20688) we have found the opposite is true for perylene imide dyes, provided, however, that the HALS compound is combined with a benzophenone UV absorber as described above.

The amount of HALS compound used in a fluorescent PVC composition of the present invention is in the range of about 0.1 to about 3 percent, and preferably in the range of about 0.4 to about 1 percent based on the total weight of the PVC formulation used to fabricate a fluorescent PVC article.

The present invention is further based in part on the discovery that a flexible PVC sheet having reflective cube-corner microprisms can retain a much greater degree of retroreflectivity after accelerated aging if the formulation used to fabricate the sheet incorporates a polymeric plasticizer instead of, or in combination with, the conventionally used monomeric plasticizers. Prior to the present invention, monomeric plasticizers have been used in the fabrication of flexible PVC sheeting for reflective road sign applications. The monomeric plasticizers typically used in such sheeting (e.g., dioctyl phthalates and/or diisononyl phthalates) have had molecular weights less than about 700 grams per mole.

While any polymeric plasticizer having molecular weight greater than about 1000 may be used in the invention, those having a molecular weight in the range of about 2000 to about 8000 grams per mole are preferred. Polymeric plasticizers having molecular weight in the range of about 2000 to about 5000, and most preferably in the range of about 2500 to about 4200 are particularly well-suited for fabrication of reflective PVC sheeting having enhanced retention of retroreflectivity. A preferred class of polymeric plasticizers is the aliphatic polyesters, e.g., the polyester glutarates, the polyester adipates, and polyester sebacates, and the like. Compounds of this type are readily available commercially from, for example, C.P. Hall Company. Preferred polymeric plasticizers used in the present invention are selected from the polyester glutarates and polyester adipates sold under the trade names "Plasthall P-550", "Plasthall P-645", and "Plasthall P-7046" by C.P. Hall Company of Chicago.

While the present invention contemplates PVC formulations for reflective sheeting in which the plasticizer may consist essentially entirely of polymeric plasticizers, it is preferred for optimum cost, processing and properties of PVC flexible sheets according to the invention to use the combination of a monomeric plasticizer, for example the alkylphthalate plasticizers having molecular weight under about 1000 (e.g. Exxon's "Jayflex L11P" monomeric plasticizer), with a polymeric plasticizer (e.g., C.P. Hall and Company's "Plasthall P-550", "Plasthall P-645" and/or "Plasthall P-7046") having molecular weight in the range of 2000 to about 5000. In this preferred combination of monomeric and polymeric plasticizers, the polymeric plasticizer should constitute about 25 to about 45 percent by weight of the monomeric/polymeric plasticizer mixture.

The total amount of plasticizer used in the invention (either entirely polymeric, or as a mixture of monomeric and polymeric plasticizers) is preferably in the range of about 18 to about 25 percent, and preferably in the range of about 20 to about 23 percent, based on the total weight of the PVC composition used for fabricating a PVC reflective sheet. Relative to the amount of PVC resin in a reflective sheet formulation, the total amount of the plasticizer in the PVC composition is preferably in the range of about 30 to about 35 parts per hundred parts of the PVC resin.

The improvement in retroreflectivity made possible by the present invention's use of polymeric plasticizer may be expressed in terms of "Percent Retention of Retroreflection". Briefly, Percent Retention of Retroreflection of a retroreflective sheet is determined by taking an initial measurement of reflectivity made at a -4 degree entrance angle and at a 0.2 degree observation angle. Following this measurement, the reflective PVC sheet is subjected to an elevated temperature for a predetermined amount of time. Then the retroreflectivity of the PVC sheet is measured a second time. The percentage obtained by dividing the second retroreflection measurement by the initial measurement is termed herein the "Percent Retention of Retroreflection."

The polymeric component in the compositions and articles of the present invention comprises PVC but may also contain other polymeric resin constituents. However, the resin component preferably consists essentially of polyvinyl chloride given the superior properties thereof in sheeting applications for reflective road signs and the like where flexibility, durability and good optical properties are required. The PVC is preferably solventless PVC meaning that the PVC is capable of being processed into a film of the present invention, whether through extrusion or calendaring, without the use of a solvent. The invention however does not exclude PVC films which are cast using a solvent.

PVC used to prepare the compositions and articles of the present invention using calendaring techniques preferably has an intrinsic viscosity ("I.V.") in the range of about 1.02 to about 1.14, and preferably in the range of about 1.08 to about 1.10. It should be recognized however that PVC resins having IV below about 1.02 are nevertheless within the scope of the invention. Other things being equal, the use of lower I.V. resins can detract from the retroreflectivity retention of a PVC reflective sheet. However, those skilled in the art will recognize that the lesser rigidity resulting from use of lower I.V. resin may be offset by an appropriate choice of polymeric plasticizers, fillers and other additives. On the other hand, PVC resins above about 1.14 I.V. become increasingly difficult to process and exhibit increasingly poor cold flexibility. Examples of PVC resins that are suitable for use in the present invention are the Georgia Gulf 2100, 2110 and 2095 resins.

The total amount of PVC resin in a flexible sheet according to the present invention is in the range of about 65 to about 80 weight percent, and preferably in the range of about 70 to about 75 weight percent based on the total weight of the formulation used to fabricate the sheet.

In a preferred aspect of the present invention, a PVC sheet for flexible sign applications which combines both a PVC resin having IV in the preferred range of about 1.08 to about 1.10, with use of a polymeric plasticizer mixture constituting about 30 to about 35 part per hundred parts by weight of the resin, provides an excellent balance of properties from the standpoint of film processability, cold flexibility and retention of retroreflectivity. While the use of the polymeric plasticizer, per se, can enhance the retention of retroreflectivity in a PVC retroreflective sheet according to the invention, the additional step of using a higher IV PVC resin (preferably in the range of about 1.08 to about 1.10) results in even better retention or reflectivity. The combination of PVC with polymeric plasticizer makes possible for the first time a PVC retroreflective sheet having greatly enhanced retention of reflectivity (in comparison to sheets using monomeric plasticizer). Preferably the PVC sheets of the present invention exhibit and Average Percent Retention of Retroreflection (as determined herein) of about 60% or greater.

In order to achieve a PVC roadway sign having maximum useful life, the PVC film used to fabricate the sign can utilize both the fluorescence-stabilizing aspect of the present invention (i.e., the combination of benzophenone and HALS) and the retroreflectivity-enhancing aspect thereof (use of a polymeric plasticizer with optional higher IV resin). Nevertheless, it should be understood that each of these enhancements may be practiced independently of one another. Accordingly, in addition to reflective PVC fluorescent sheeting for road signs and other applications, the invention also encompasses fluorescent PVC articles which do not have reflective elements as well as retroreflective PVC articles which do not incorporate fluorescent dyes.

In addition to the unique combination of perylene imide dyes, plasticizers, UV absorbers and HALS discussed above, other conventional processing aids for PVC fabrication may be used such as fillers, heat stabilizers, lubricants, etc. The present invention does not require any special measures with respect to these additional conventional processing additives, which, when added in their normal amounts to a PVC resin formulation have not been found to impact the features of the present invention.

Polyvinyl chloride films according to the present invention may be made by any of the well-known techniques in the art, including calendaring a suitable PVC formulation into films having nominal thicknesses which are typical for retroreflective sheets, i.e., 7–13 mils and preferably about 8–10 mils. PVC film thickness may vary with the particular application. If the film is to be used for retroreflective applications it may be further processed in a well known manner to form a plurality of retroreflective elements on the sheet such as, for example, corner cube microprisms, four-sided prisms, Fresnel lenses, rounded lenses, and microspheres. Reference may be had to U.S. Pat. Nos. 5,156,863; 4,486,363; 4,601,861; 4,505967; 5,316,838; and 4,025,159, and WO/9920688 (published Apr. 29, 1999) all of which are incorporated by reference herein in their entirety.

The present invention contemplates fluorescent reflective sheeting for road sign applications where there is no need for additional UV-protective or UV-filtering Nevertheless, the invention does not exclude flexible road signs in which such protective layers are used to provide further enhancements in fluorescence longevity. An example of the use of such protective layers can be found in PCT application WO/9948961 (published Sep. 30, 1999) incorporated herein by reference in its entirety.

The following examples are provided to illustrate different embodiments of the invention and are not intended to limit the scope thereof as defined in the appended claims.

EXAMPLE 1

Fluorescence Stabilization

Using standard vinyl laboratory processing techniques on a C.W. Brabender Plasti-Corder Prep-Mixer (manufactured by C.W. Brabender Instruments, Inc. of Hackensack, N.J.), five vinyl Formulations 1 through 5 (see below) were prepared and converted into retroreflective films using laboratory equipment. Formulation 6 was used to prepare a PVC film using conventional production techniques on a commercial scale. Formulations 1 through 4 are for comparison purposes. Formulation 5 and 6 contain a HALS/benzophenone formulation according to the present invention. Laboratory processing of formulations 1 through 5 occurred in four stages in accordance with techniques well known in the art. First, all components were blended together to allow the plasticizers and heat stabilizers to be absorbed into the polyvinyl chloride resin. This first stage occurred under continuous mixing at 88° C. To assist in dispersion of the fluorescent dyes, the perylene imide dyes (BASF "Lumogen F Orange 240" and BASF "Lumogen F Red 300") were dispersed into the plasticizer using high speed dispersion techniques with a cowles blade prior to addition to the vinyl resin. The second stage involved fusing the powdered vinyl material under high shear at temperatures between 185° C.–190° C. The UV-absorbers and hindered amine light stabilizers were added during this second stage. The third stage involved converting the fused mass of plasticized vinyl resin into an 8-mil film. This was accomplished using a heated platen press. The press was set to 390° F. and 8.5 kpsi of pressure, and the vinyl was under pressure for 2 minutes. Finally, all of the resultant films, including the film from formulation 6 were embossed under heat and pressure in a known manner to form corner-cube microprisms on one side of the film.

Each of the formulations contained between 30 to 35 parts of plasticizer by weight. Formulations 5 and 6 consisted of a mixture of polymeric and monomeric plasticizer (C. P. Hall Company "Plasthall P-550" or "Plasthall P-645") and monomeric phthalate plasticizer. In Formulation 5 the plasticizer mixture contained about 66 weight percent polymeric plasticizer and about 34 weight percent monomeric plasticizer. In formulation 6, the amounts of polymeric and monomeric plasticizer were 39 and 61 weight percent, respectively based on the total weight of the plasticizer mixture. The polyester plasticizers Plasthall P-550 and Plasthall P-645 are viewed as equivalent for purposes of the tested formulations of the present invention. The PVC resin component in each formulation included conventional amounts of commercially available lubricants, heat stabilizers, and other additives which were not found to materially contribute to or detract from the fluorescence durability or reflectivity enhancements offered by the present invention. Examples of processing additives which can be used are Witco "Hystyrene 5016NF" acid lubricant used to prevent sticking of the resin formulation to the processing equipment (approximately 0.10 parts per hundred parts resin ("pphr"); CP Hall "ESO" an epoxidized soybean oil acting as a secondary heat stabilizer and affording some plasticizing benefit (approximately 5 pphr); Witco "Mark 4821" liquid barium zinc heat stabilizer (approximately 3 pphr); Witco "Mark 6055" a solid "booster" heat stabilizer (approximately 0.5 pphr); Great lakes Chemical "Anox PP18" a conventional anti-oxidant; and a suitable microbial agent (both at approximately 0.25 pphr).

As used herein the term "pphr" is based on weight and the percentages of ingredients listed in formulations 1 through 6 below are weight percentages based on the total weights of the formulations.

| Formulation 1 (No HALS or UV Absorbers) - - Comparison | |
|---|---|
| 0.181% | BASF Lumogen F Orange 240 perylene imide dye |
| 0.018% | BASF Lumogen F Red 300 perylene imide dye |
| 0% | HALS |
| 0% | UV absorber |
| 20.91% | Mixture of monomeric and polymeric plasticizers |
| 78.89% | Georgia Gulf 2095 PVC Resin (plus conventional processing additives) |

| Formulation 2 (Benzotriazole UV Absorber; No HALS) - - Comparison | |
|---|---|
| 0.241% | BASF Lumogen F Orange 240 perylene imide dye |
| 0.019% | BASF Lumogen F Red 300 perylene imide dye |
| 1.46% | Great Lakes Lowilite 55 UV-absorber 2-(2'-hydroxy-5-methylphenyl)benzotriazole |
| 0% | HALS |
| 20.84% | Mixture of monomeric and polymeric plasticizers |
| 77.47% | Georgia Gulf 2100 PVC Resin (plus conventional processing additives) |

| Formulation 3 (Benzophenone UV Absorber: No HALS) - - Comparison | |
|---|---|
| 0.241% | BASF Lumogen F Orange 240 perylene Imide dye |
| 0.019% | BASF Lumogen F Red 300 perylene imide dye |
| 1.46% | Great Lakes Lowilite 22 UV-absorber 2-hydroxy-4-n-octoxybenzophenone |
| 0% | HALS |
| 20.84% | Mixture of monomeric and polymeric plasticizers |
| 77.47% | Georgia Gulf 2100 PVC Resin (plus conventional processing additives) |

| Formulation 4 (Benzophenone UV Absorber; No HALS) - - Comparison | |
|---|---|
| 0.213% | BASF Lumogen F Orange 240 perylene Imide dye |
| 0.019% | BASF Lumogen F Red 300 perylene imide dye |
| 2.12% | Great Lakes Lowilite 22 UV-absorber 2-hydroxy-4-n-octoxybenzophenone |
| 0% | HALS |
| 20.70% | Mixture of monomeric and polymeric plasticizers |
| 76.95% | Georgia Gulf 2100 PVC Resin (plus conventional processing additives) |

| Formulation 5 (HALS Plus Benzophenone UV Absorber) - - Invention | |
|---|---|
| 0.212% | BASF Lumogen F Orange 240 perylene imide dye |
| 0.018% | BASF Lumogen F Red 300 perylene imide dye |
| 2.12% | Great Lakes Lowilite 22 UV-absorber 2-hydroxy-4-n-octoxybenzophenone |
| 0.48% | Great Lakes Lowilite 62 oligomeric HALS (dimethyl succinate polymerized with 4-hydroxy-2,2,6,6-tetramethyl-1-piperidine ethanol) |
| 20.60% | Mixture of monomeric and polymeric plasticizers |
| 76.57 | Georgia Gulf 2100 PVC Resin (plus conventional processing additives) |

| Formulation 6 (HALS Plus Benzophenone UV Absorber) - - Invention | |
|---|---|
| 0.208% | BASF Lumogen F Orange 240 perylene imide dye |
| 0.020% | BASF Lumogen F Red 300 perylene imide dye |
| 2.00% | Ferro Corp UV Chek AM-300 (2-hydroxy-4-n-octoxybenzophenone |
| 0.50% | Great Lakes Lowilite 62 oligomeric HALS (dimethyl succinate polymerized with 4-hydroxy-2,2,6,6-tetramethyl-1-piperidine ethanol) |
| 21.12% | Mixture of monomeric and polymeric plasticizers |
| 76.07% | Georgia Gulf 2110 PVC Resin (plus conventional processing additives) |

Accelerated Weathering

Each of the above formulations 1 to 6 was placed into a xenon arc accelerated "weather-o-meter" and the amount of fading was monitored through routine color measurements on a HunterLab LS-6000 calorimeter. Table 1, below shows the results after approximately 500 hours of weathering. Results are recorded with respect to the CIELAB color difference measure $\Delta E$ and compare the initial color readings taken prior to accelerated weathering and the color readings after approximately 500 hours. $\Delta E$ is a conventional measure of color change. The smaller the $\Delta E$, the less amount of color change.

TABLE 1

Fluorescence Durability Results

| Formulation Number | Hours in Xenon Chamber | CIELAB Color Difference $\Delta E^*$ | Comments |
|---|---|---|---|
| 1 | 483 | 53.76 | Almost completely faded. A very light pink shade. |

TABLE 1-continued

Fluorescence Durability Results

| Formulation Number | Hours in Xenon Chamber | CIELAB Color Difference ΔE* | Comments |
|---|---|---|---|
| 2 | 556 | 25.02 | A noticeable color shift. |
| 3 | 556 | 14.03 | Still looks good, but a slight shift can be noted. |
| 4 | 556 | 14.63 | Still looks good, but a slight shift can be noted. |
| 5 | 556 | 10.32 | Very bright. Some slight fading, but very obvious. |
| 6 | 506 | 10.97 | Very bright. Some slight fading, but not very obvious. |

EXAMPLE 2

Retention of Retroreflectivity

Four different vinyl films A through D were prepared using the techniques described in Example 1. The ingredients of each formulation are listed in Table 2 below. In each formulation, the identity and amount of all of the components were held constant with the exception of the ratio of polymeric plasticizer (C.P. Hall "Plasthall P-550") to monomeric plasticizer (Exxon "Jayflex L11P"). The polyvinyl chloride resin used in each of the films had an intrinsic viscosity of 1.02.

TABLE 2

Formulation for Enhanced Retroreflectivity

| Component (pphr by weight) | A (comp.) | B | C | D |
|---|---|---|---|---|
| Georgia Gulf 2100 PVC Resin | 100.00 | 100.00 | 100.00 | 100.00 |
| Witco Hystyrene 5016NF acid lubricant | 0.10 | 0.10 | 0.10 | 0.10 |
| C.P. Hall & Co. Plasthall P-550 (Polymeric Plasticizer) | 0.00 | 10.00 | 20.00 | 30.00 |
| Exxon Jayflex L11P (Monomeric Plasticizer) | 30.00 | 20.00 | 10.00 | 0.00 |
| CP Hall ESO | 5.00 | 5.00 | 5.00 | 5.00 |
| Witco Mark 4821 Heat Stabilizer | 3.00 | 3.00 | 3.00 | 3.00 |
| Witco Mark 6055 Heat Stabilizer | 0.50 | 0.50 | 0.50 | 0.50 |
| Great Lakes Chemical Anox PP18 | 0.25 | 0.25 | 0.25 | 0.25 |

Films having thickness of about 8 mils (±1 mil) were made from each of the above formulations. Each of the films was embossed under heat and pressure to form a cube-corner retroreflective microprismatic material according to procedures well known in the art.

Percent Retention of Retroreflection of Formulations A through D

The "Average Percent Retention of Retroreflection" for each of the four films A through D above was determined by measuring an initial level of retroreflection and then taking the same measurement again after heating the film for a predetermined time and temperature. For purposes of measuring retroreflectivity enhancements afforded to a reflective PVC sheet according to the present invention, the ratio of the second measurement to the first measurement (expressed as a percentage) is termed the "Percent Retention of Retroreflection". The detailed procedure for obtaining this value is as follows: After embossing to form the microprismatic retroreflective elements, the samples were allowed to stabilize for approximately 2–3 days under ambient temperature conditions. The initial retroreflectivity was then measured on each sample according to principles known in the art and described in ASTM E 810-94. The observation angle was set to 0.20 and the entrance angle ($\beta 1$) was set to −40. After stabilization, the samples were placed into a laboratory oven set to 110° F. for 7 days. The purpose of the heating was to promote plasticizer migration from the samples. After the 7 days in the oven, the retroreflectivity of each sample was measured a second time. The % retention of retroreflection after heating was then calculated. The term "Average" used as a modifier to "Percent Retention of Retroreflection" denotes that at least three samples were used for each formulation and the average % retention was reported.

The Percent Retention of Retroreflection for each of films A through D is shown in Table 3, below:

TABLE 3

Percent Retention of Retroreflection

| % Polymeric Plasticizer | % Retention of Retroreflection |
|---|---|
| Formulation A - - 0% (Comparative) | 49% |
| Formulation B - - 33% | 60% |
| Formulation C - - 67% | 88% |
| Formulation D - - 100% | ~100.% |

As can be seen from the data in Table 3 above, Percent Retroreflection is substantially enhanced as the ratio of polymeric plasticizer to monomeric plasticizer is increased. The plasticizer may consist entirely of the polymeric plasticizer (see formulation D above). However, a preferred formulation from the standpoint of optimal cost as well as optimal processibility of PVC resin into suitable films for retroreflective sheeting, is one in which a mixture of polymeric and monomeric plasticizers is used such that the amount of polymeric plasticizer is in the range of about 25 to about 45 percent by weight of the total weight of the monomeric/polymeric plasticizer mixture in the formulation; the total amount of the plasticizer mixture in the formulation is about 30 to about 35 parts per hundred parts resin; and the PVC resin has an I.V. of about 1.08 to about 1.10. This combination of formulation characteristics further results in a sheet which has excellent cold flexibility. By "cold flexibility" is meant the ability to manually roll the sheet up in below-freezing winter temperatures normally encountered throughout the North American climate.

I claim:

1. A fluorescence-stabilized polymeric composition comprising: polyvinyl chloride resin; a fluorescent dye selected from the class consisting of perylene imide fluorescent dyes; an ultraviolet absorbing compound selected from the class consisting of benzophenone ultraviolet absorbers; and a light stabilizing compound selected from the class consisting of polymeric hindered amine light stabilizer compounds having molecular weight greater than about 1500.

2. The polymeric composition of claim 1 wherein the perlyene imide dye has the formula:

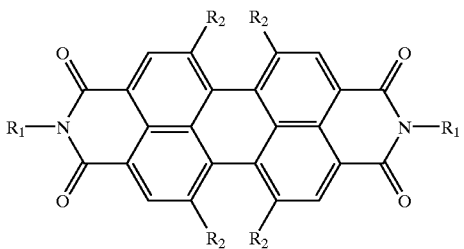

where $R_1$ is $C_5$–$C_{20}$-alkyl which may be interrupted by an oxygen atom, or is phenyl which is monosubstituted or poly substituted by $C_1$–$C_{13}$ alkyl or $C_1$–$C_{13}$-alkoxy; and $R_2$ is hydrogen, chlorine, phenoxy, or halogen-, $C_1$–$C_4$ alkyl, or $C_1$ to $C_4$ alkoxy-substituted phenoxy.

3. The polymeric composition of claim 2 wherein the dye is a fluorescent red dye or fluorescent orange dye.

4. The polymeric composition of claim 2 wherein $R_1$ is selected from —$C_3H_6$—$OC_2H_5$ and 2,6-diisopropylphenyl; and $R_2$ is selected from H, Cl and phenoxy.

5. The polymeric composition of claim 1 wherein the benzophenone UV absorber is selected from the group consisting of benzophenones having the general formula:

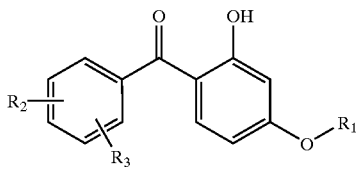

where $R_1$ is $C_1$ to $C_8$ alkyl; and $R_2$ and $R_3$ are independently H, OH, $C_1$–$C_8$ alkoxy, $C_1$ to $C_4$ alkyl or halogen.

6. The polymeric composition of claim 5 wherein the benzophenone UV absorber comprises a compound selected from the group consisting of 2-hydroxy-4-n-octoxybenzophenone and 2-hydroxy-4-methoxybenzophenone.

7. The polymeric composition of claim 1 wherein the hindered amine light stabilizer compound comprises a compound selected from the group consisting of the polymerization products of dimethyl succinate and 4-hydroxy-2,2,6,6-tetramethyl-1-piperidine ethanol having the general formula:

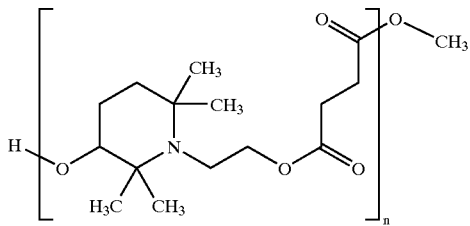

wherein n is selected such that the compound has a molecular weight greater than about 2000.

8. The polymeric composition of claim 1 wherein the composition is fabricated in the form of a film or sheet comprising a plurality of retroreflective elements.

9. The polymeric composition of claim 8 wherein the retroreflective elements are selected from the group consisting of cube-corners and microspheres.

10. The polymeric composition of claim 1 wherein the polyvinyl chloride has an intrinsic viscosity in the range of about 1.08 to about 1.10, and wherein the composition further comprises a polymeric plasticizer having molecular weight greater than about 1000.

11. The polymeric composition of claim 10 wherein the polymeric plasticizer is selected from the group consisting of polyester glutarate plasticizers, polyester adipate plasticizers and polyester sebacate plasticizers having molecular weight in the range of about 2000 to about 8000.

12. The polymeric composition of claim 10 fabricated in the form of a film comprising a plurality retroreflective elements.

13. The polymeric composition of claim 12 wherein the retroreflective elements are selected from the group consisting of cube-corners.

14. A flexible, retroreflective road sign comprising the composition of any of claims 1 through 13.

15. A flexible road sign capable of being manually rolled and unrolled by a user, wherein the sign comprises a fluorescent, retroreflective polymeric sheet, said sheet comprising: a polyvinyl chloride resin having an intrinsic viscosity in the range of about 1.02 to about 1.14; a polymeric plasticizer having molecular weight in the range of about 2000 to about 5000; a fluorescent perylene imide dye; an ultraviolet absorbing benzophenone compound; a polymeric hindered amine light stabilizing compound having molecular weight greater than about 1500; and wherein said sheet comprises a plurality of retroreflective elements.

16. The flexible road sign of claim 15 wherein the polyvinyl chloride resin has an intrinsic viscosity in the range of about 1.08 to about 1.10 and constitutes about 70 to about 75 percent by weight of the polymeric sheet.

17. The flexible road sign of claim 15 wherein the polymeric plasticizer has molecular weight in the range of about 2500 to about 4200.

18. The flexible road sign of claim 15 wherein the polymeric sheet comprises a mixture of polymeric and monomeric plasticizer, said monomeric plasticizer being selected from the group consisting of dialkyl phthalate compounds.

19. The flexible road sign of claim 18 wherein the plasticizer mixture comprises about 25 to about 45 percent by weight polymeric plasticizer, and wherein the plasticizer mixture is present in the polymeric sheet in an amount ranging from about 30 to about 35 parts per hundred parts by weight of the polyvinyl chloride resin in the polymeric sheet.

20. The flexible road sign of claim 15 wherein the fluorescent dye is selected from the class of perylene imide dyes having the formula:

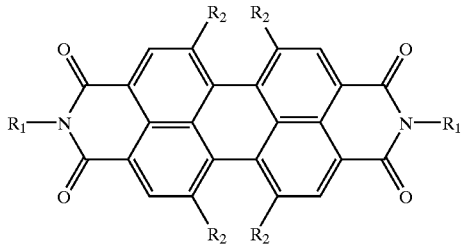

where $R_1$ is $C_5$–$C_{20}$-alkyl which may be interrupted by an oxygen atom, or is phenyl which is monosubstituted or poly substituted by $C_1$–$C_{13}$ alkyl or $C_1$–$C_{13}$-alkoxy; and $R_2$ is hydrogen, chlorine, phenoxy, or halogen-, $C_1$–$C_4$ alkyl, or $C_1$ to $C_4$ alkoxy-substituted phenoxy.

21. The flexible road sign of claim 15 wherein the dye is a fluorescent red dye or fluorescent orange dye.

22. The flexible road sign of claim 20 wherein $R_1$ is selected from —$C_3H_6$—$OC_2H_5$ and 2,6-diisopropylphenyl; and $R_2$ is selected from H, Cl and phenoxy.

23. The flexible road sign of claim 20 wherein the fluorescent dye constitutes about 0.05 to about 0.5 percent by weight of the polymeric sheet.

24. The flexible road sign of claim 15 wherein the UV absorbing compound is selected from the group consisting of ultraviolet absorbing benzophenone compounds having the general formula:

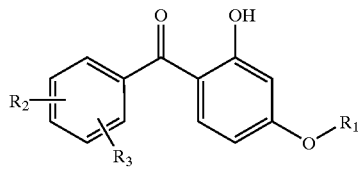

where $R_1$ is $C_1$ to $C_8$ alkyl; and $R_2$ and $R_3$ are independently H, OH, $C_1$–$C_8$ alkoxy, $C_1$ to $C_4$ alkyl or halogen. Preferably $R_2$ and $R_3$ are H, and $R_1$ is selected from -n-$C_8H_{17}$ or —$OCH_3$.

25. The flexible road sign of claim 24 wherein the benzophenone compound is selected from the group consisting of 2-hydroxy-4-n-octoxybenzophenone and 2-hydroxy-4-methoxybenzophenone.

26. The flexible road sign of claim 15 wherein the light stabilizing compound comprises the polymerization product of dimethyl succinate and 4-hydroxy-2,2,6,6-tetramethyl-1-piperidine ethanol having molecular weight greater than about 2000.

27. The flexible road sign of claim 26 wherein the hindered amine light stabilizing compound has the formula:

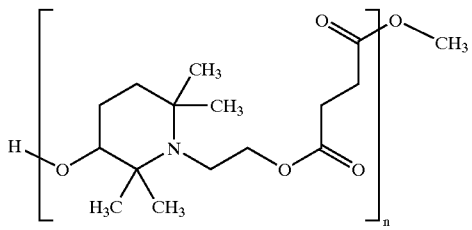

where n is selected such that the compound has a molecular weight greater than about 2500.

28. The flexible road sign of claim 15 wherein the polymeric sheet has adhered thereto in laminar configuration at least one additional layer capable of reducing or filtering the amount of ultraviolet light contacting said polymeric sheet.

29. A flexible, rollable fluorescence-stabilized retroreflective road sign comprising a retroreflective, flourescent polymeric sheet, said sheet comprising;

(i) polyvinyl chloride resin having an intrinsic viscosity in the range of about 1.08 to about 1.10;

(ii) a plasticizer mixture comprising (a) a polymeric plasticizer selected from polyester glutarate, adipate or sebacate plasticizers having molecular weight in the range of about 2500 to about 4200, and (b) a monomeric phthalate plasticizer having molecular weight less than about 1000; wherein the polyester plasticizer constitutes about 25 to about 45 percent by weight of the plasticizer mixture; said plasticizer mixture being present in the polymeric sheet in an amount ranging from about 30 to about 35 parts per hundred parts by weight of said polyvinyl resin in the sheet;

(iii) one or more perylene imide fluorescent dyes, said one or more dyes in combination constituting about 0.05 to about 0.5 percent by weight of the polymeric sheet;

(it) an ultraviolet absorbing compound comprising 2-hydroxy4-n-octoxybenzophenone present in an amount constituting about 0.2 to about 4 percent by weight of the polymeric sheet;

(v) a polymeric hindered amine light stabilizing compound comprising the polymerization product of dimethyl succinate and 4-hydroxy-2,2,6,6-tetramethyl-1-piperidine and having molecular weight greater than about 2500 wherein the light stabilizing compound constitutes about 0.1 to about 3 percent by weight of the polymeric sheet; and (vi) a plurality of cube-corner retroreflective elements.

* * * * *